United States Patent
Spielberg et al.

(10) Patent No.: US 8,595,172 B2
(45) Date of Patent: Nov. 26, 2013

(54) ENSURING HIGH AVAILABILITY OF SERVICES VIA THREE PHASE EXCEPTION HANDLING

(75) Inventors: Lars Spielberg, St. Leon-Rot (DE); Alex Gruener, Walldorf (DE)

(73) Assignee: SAP AG, Walldorf (DE)

( * ) Notice: Subject to any disclaimer, the term of this patent is extended or adjusted under 35 U.S.C. 154(b) by 894 days.

(21) Appl. No.: 12/541,208

(22) Filed: Aug. 14, 2009

(65) Prior Publication Data

US 2011/0040705 A1 Feb. 17, 2011

(51) Int. Cl.
*G06N 5/02* (2006.01)

(52) U.S. Cl.
USPC .............................................. 706/47; 719/318

(58) Field of Classification Search
USPC .............................................. 706/47; 719/318
See application file for complete search history.

(56) References Cited

U.S. PATENT DOCUMENTS

| | | | |
|---|---|---|---|
| 7,869,376 B2 * | 1/2011 | Busch et al. ................ | 370/248 |
| 2004/0230674 A1 * | 11/2004 | Pourheidari et al. ........ | 709/223 |
| 2007/0168349 A1 * | 7/2007 | Sanghvi et al. ............. | 707/10 |
| 2007/0174815 A1 * | 7/2007 | Chrysanthakopoulos et al. ........................ | 717/120 |
| 2008/0115123 A1 * | 5/2008 | Kelly et al. ................. | 717/177 |

OTHER PUBLICATIONS

Hwang et al ("GridWorkflow: A Flexible Failure Handling Framework for the Grid" IEEE 2003.*

Hwang et al ("A Flexible Framework for Fault Tolerance in the Grid" 2003).*

Nagios; Nagios Core Version 3.x Documentation; copyright Nagios Core Development Team and Community Contributors 2009; copyright Ethan Galstad 1999-2009; pp. 4-5; 174-175; 193-197; 208-214; 253-255 (http://nagios.sourceforge.net/docs/nagios-3.pdf).

Jim Frey et al.; Tivoli Software; Redbooks Paper; Copyright IBM Corp. 2003; 10 pages (http://www.redbooks.ibm.com/redpapers/pdfs/redp3676.pdf).

\* cited by examiner

*Primary Examiner* — Lut Wong

(57) ABSTRACT

Described herein are systems and methods for three phase exception handling ensuring high availability of services. Via unified application program interface (API), one or more inspector instances are observing the behavior one or more services. The three phase exception handling is triggered upon observing an abnormal service behavior. Phase one comprises executing one or more commands from the unified API by the one or more inspector instances in attempt to resolve the abnormal service behavior and notifying a centralized inspector engine. Phase two comprises executing one or more predefined rules according to the current service state by the centralized inspector engine in attempt to resolve the abnormal service behavior and notifying an administrator. Phase three comprises abnormal service behavior analysis by the administrator and executing customized by the administrator rules to resolve the abnormal service behavior.

21 Claims, 4 Drawing Sheets

ENSURING HIGH AVAILABILITY OF SERVICES VIA THREE PHASE EXCEPTION HANDLING

FIELD OF THE INVENTION

The field of the invention relates generally to software, and particularly but not exclusively, to three phase exception handling ensuring high availability of services.

BACKGROUND OF THE INVENTION

Modern system landscapes provide a large number of services, having different vendors, versions, and interfaces. Ensuring high availability of these services is crucial for the service customers. Keeping all services available is a tedious job, requiring a number of well trained administrators. The administrators must observe the status of the services on a regular basis, to deal with life cycle management, service updates, abnormal service behavior, etc. The increasing complexity of the system landscapes increases the time needed to investigate and solve the issues that arise. It becomes harder for the administrators to keep up with the increasing number of services and customers, which leads to critical service downtimes.

An automated approach is required to deal with these issues in order to ensure high availability of services and to reduce the maintenance costs resulting from manual intervention. The automated approach would ensure minimal service downtime in case of abnormal service behavior and would also decrease the necessity of human intervention. The administrators would have to deal with only issues that are not solved by automation upon a specific notification from the system after the automated approach has failed to solve the issue.

SUMMARY OF THE INVENTION

Described herein are embodiments of systems and methods for three phase exception handling ensuring high availability of services. One or more inspector instances observe the behavior of one or more services via an unified application program interface (API). The three phase exception handling is triggered upon observing an abnormal service behavior. Phase one comprises executing one or more commands from the unified API by the one or more inspector instances in attempt to resolve the abnormal service behavior and notifying a centralized inspector engine. Phase two comprises executing one or more predefined rules according to the current service state by the centralized inspector engine in an attempt to resolve the abnormal service behavior and notifying an administrator. Phase three comprises abnormal service behavior analysis by the administrator and executing customized by the administrator rules to resolve the abnormal service behavior.

Additional features and advantages will be made apparent from the following detailed description of illustrated embodiments, which proceeds with reference to the accompanying drawings.

BRIEF DESCRIPTION OF THE DRAWINGS

A better understanding of the present invention can be obtained from the following detailed description in conjunction with the following drawings, in which.

DETAILED DESCRIPTION

Embodiments of systems and methods for ensuring high availability of services via three phase exception handling are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "this embodiment" means that a particular feature, structure, or characteristic described in connection with the embodiment is included in at least one embodiment of the present invention. Thus, the appearances of the phrases "in one embodiment" or "in this embodiment" in various places throughout this specification are not necessarily all referring to the same embodiment. Furthermore, the particular features, structures, or characteristics may be combined in any suitable manner in one or more embodiments.

Figure 1:
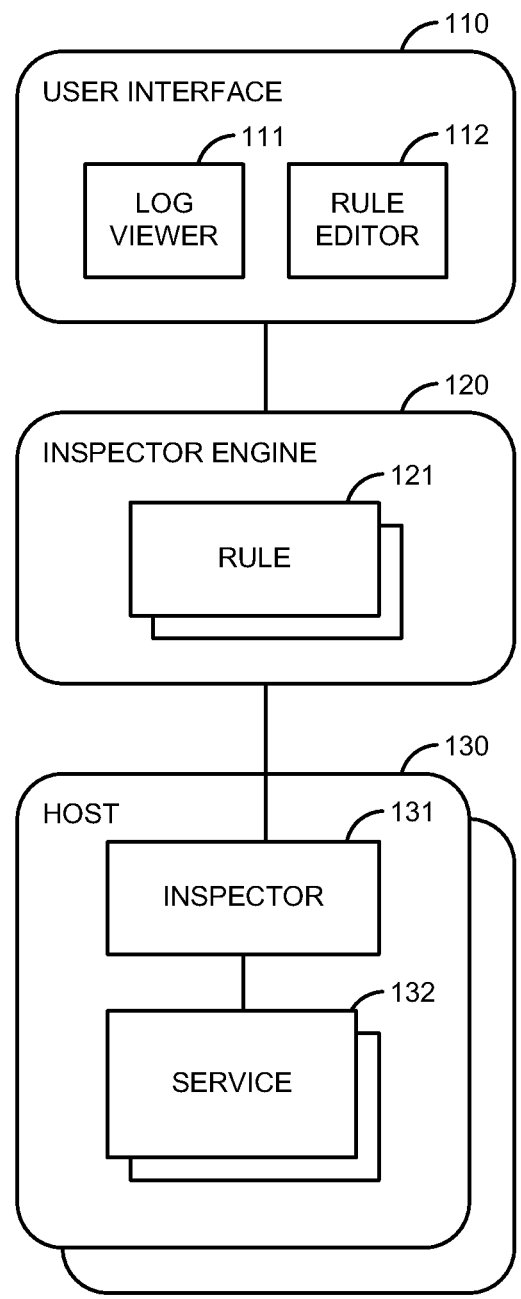
FIG. 1 is a block diagram of an exemplary system ensuring high availability of services via three phase exception handling, in accordance with an embodiment of the present invention.

FIG. 1 is a block diagram of a system ensuring high availability of services via three phase exception handling. One or more services 132 are running on one or more hosts 130. According to one embodiment, on each host 130 there is preferably one inspector instance 131, which is performing the first step of the exception handling. The inspector instance 131 observes the behavior of the one or more services 132 via unified application program interface (API). On abnormal service behavior, the inspector 131 tries to restore service availability by executing one or more commands of the unified API, such as restarting the service a predefined number of times. In one embodiment, these commands may be predefined and stored on the inspector instance 131. Since the inspector 131 is using the unified API, it is capable of managing any kind of service, supporting the unified API. The inspector 131 logs the result of the commands execution and contacts the inspector engine 120. In one embodiment of the invention, the API may provide the following commands: Stop( ), to stop a service; Start( ), to start a service; Update( ), to update a service to a latest version; Status( ), to get service state; Diagnosis( ), to perform abnormal service behavior diagnostics; GetLog( ), to get service logs; etc.

The inspector engine 120 performs the second step of the exception handling in case the inspector 131 is unable to restore the availability of the one or more services 132. In case the abnormal service behavior is not resolved by the inspector 131, the inspector engine 120 executes one of the rules 121. Rule 121 is preferably a workflow consisting of one or more commands to restore service availability. The rule 121 may include commands of the unified API as well as commands designed by an administrator. The inspector engine 120 executes one rule 121 upon receiving an event from an inspector instance 131. The event sent by the inspector 131 notifies the inspector engine 120 about the current service state. In one embodiment of the invention, there may be three service states defined: ONLINE, designating that the service is available; OFFLINE, designating that the service is not available; and UNKNOWN, if the state cannot be determined due to an abnormal service behavior. There may be a rule 121 defined for each of the available service states. If the service is still unavailable after the rule is executed, the inspector engine 120 logs the result of the rule execution and informs the administrator (e.g., via an e-mail or an instant mobile phone message).

Phase three of the exception handling is performed by the administrator, who analyzes the specific issue and provides a solution using the user interface 110. The user interface 110 displays the current status and presents the administrator with possible methods to react. The log viewer 111 provides the administrator with the information, collected by the inspector instance 131 and the inspector engine 120. The rule editor 112 allows the administrator to create custom commands and rules, which when executed by the inspector engine 120 can solve the specific issue and restore service availability. In one embodiment, the user interface 110 may also provide the administrator with tips to solve the specific issue.

Figure 2:
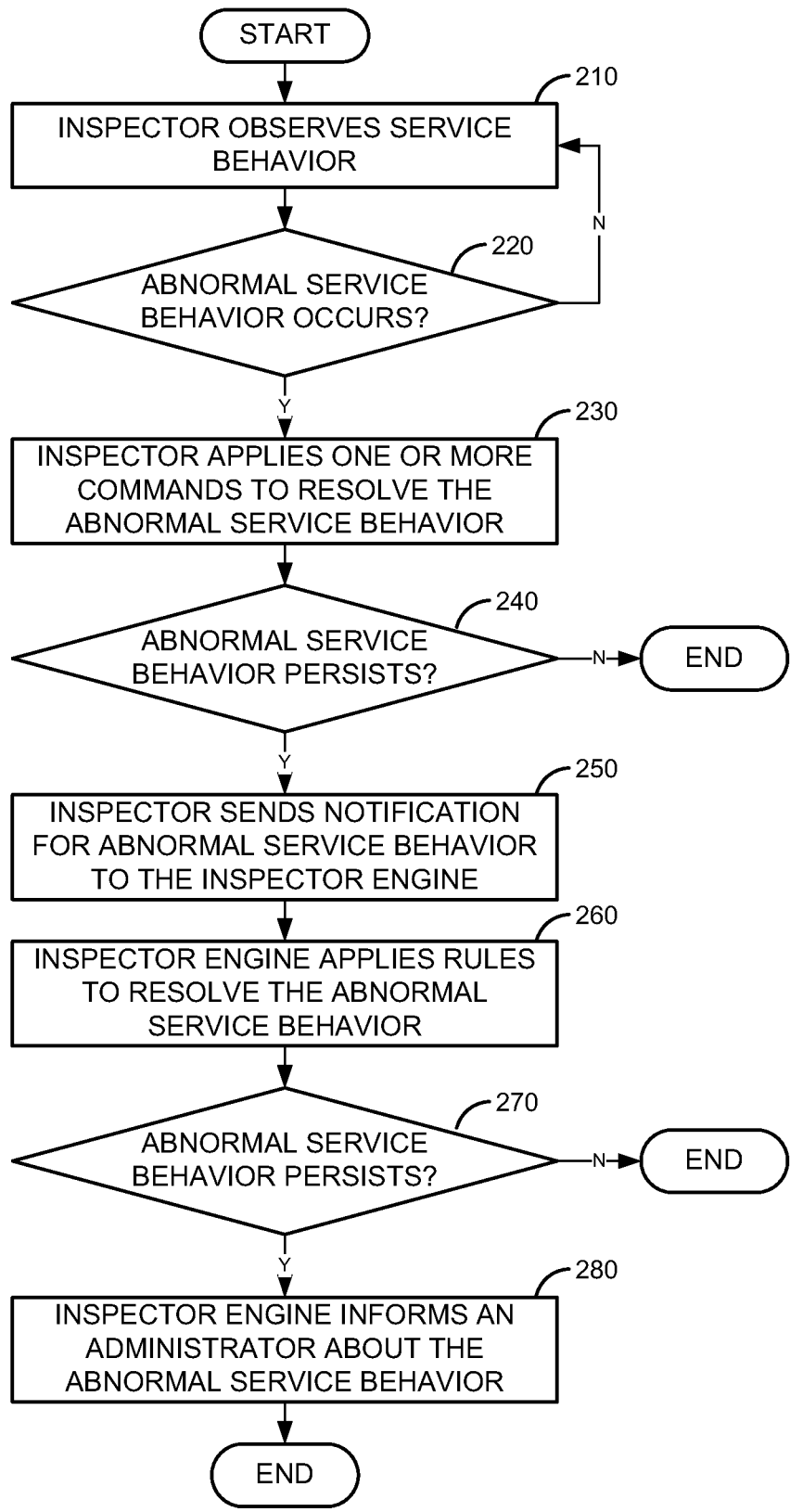
FIG. 2 is a block diagram of an exemplary method ensuring high availability of services via three phase exception handling, in accordance with an embodiment of the present invention.

FIG. 2 is a block diagram of a method ensuring high availability of services via three phase exception handling. At block 210, the inspector 131 observes the service behavior until an abnormal service behavior occurs. If an abnormal service behavior is detected at block 220, the inspector 131 initiates the first phase of the exception handling by applying one or more commands to resolve the abnormal service behavior at block 230. The inspector 131 applies simple commands, such as service restart, or memory cleanup, a predefined number of times. After the execution of the one or more commands is completed, a check is performed if the abnormal service behavior persists at block 240. If the abnormal service behavior persists, the second phase of the exception handling is initiated at block 250 by sending a notification to the inspector engine 120. Upon receiving the notification, the inspector engine 120 executes one or more rules to resolve the abnormal service behavior at block 260. The inspector engine 120 executes the one or more rules according to the current service state. After the execution of the one or more rules, a check is performed if the abnormal service behavior persists at block 270. If the abnormal service behavior persists, the inspector engine 120 initiates the third phase of the exception handling by notifying an administrator about the abnormal service behavior at block 280. The administrator can solve the issue by analyzing the logs, provided by the inspector engine 120, and designing and executing one or more custom rules using the user interface 110. The process described above minimizes service downtime by resolving automatically the abnormal service behavior at phases one and two and also allows the administrator to focus on more complicated issues that are not automatically solvable.

Figure 3:
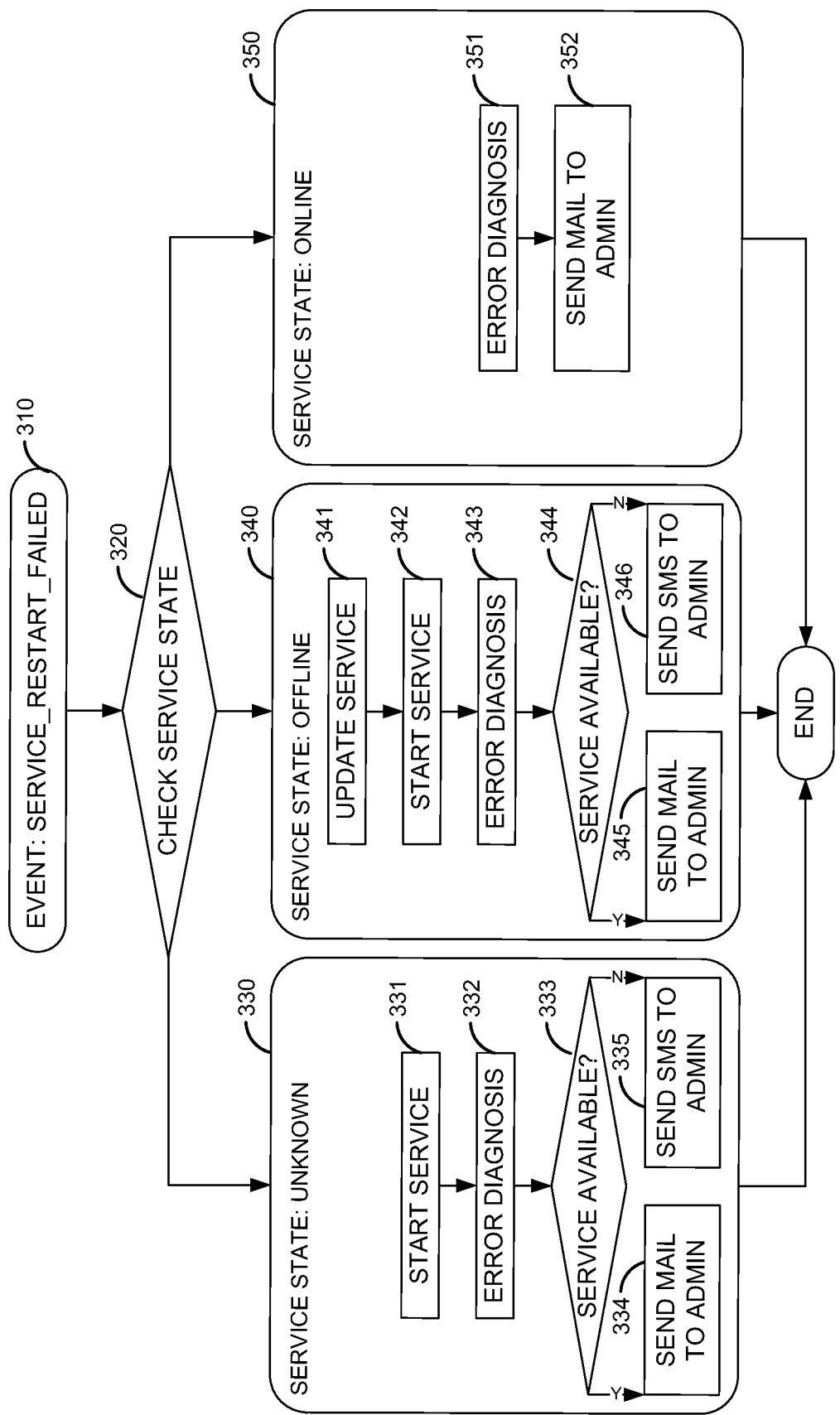
FIG. 3 is an example of event processing and rule execution method, performed by the inspector engine upon receiving an event for abnormal service behavior, in accordance with an embodiment of the present invention.

FIG. 3 is an example of event processing and rule execution method, performed by the inspector engine upon receiving an event notifying an abnormal service behavior. The notification sent by the inspector 131 at block 250 of FIG. 2 described above contains an event about abnormal service behavior. In this example, the inspector engine 120 receives a SERVICE_RESTART_FAILED event from the inspector 131 at block 310. At block 320, the inspector engine checks the current service state in order to apply a rule according to the service state. In this example, there are three service states defined: ONLINE, designating that the service is available; OFFLINE, designating that the service is not available; and UNKNOWN, if the state cannot be determined due to an abnormal service behavior.

In case the service state is UNKNOWN, the inspector engine executes the rule shown at block 330. The rule represents the following workflow. First, an attempt to start the service via a start service command is made at block 331. An error diagnosis is performed on the output, generated by the start service command at block 332. A check is performed whether the service is available at block 333 after the execution of the start service command. If the service is available, at block 334, the inspector engine 120 sends an e-mail notification to the administrator to inform him about the successful service recovery. If the service is still unavailable, at block 335, the inspector engine 120 sends an instant message to the administrator mobile phone to inform him about the unsuccessful exception handling during phases one and two. One benefit of the instant message notification is that the administrator is notified immediately in case of unsuccessful service recovery, so that he can deal with the issue manually as soon as possible.

In case the service state is OFFLINE, the inspector engine executes the rule shown at block 340. The rule represents the following workflow. First, an attempt to update the service via an update service command is made at block 341. In one embodiment, the update command may check if there is a newer version available on a central repository for one or more service components and update only the outdated components. In another embodiment, the update command may update all service components to ensure that all service components have valid contents. The workflow continues with an attempt to start the service via a start service command at block 342. An error diagnosis is performed on the output, generated by the update and start service commands at block 343. A check is performed whether the service is available at block 344 after the execution of the commands described above. If the service is available, at block 345, the inspector engine 120 sends an e-mail notification to the administrator to inform him about the successful service recovery. If the service is still unavailable, at block 346, the inspector engine 120 sends an instant message to the administrator mobile phone to inform him about the unsuccessful exception handling during phases one and two, so that he can deal with the issue manually.

In case the service state is ONLINE, the inspector engine executes the rule shown at block 350. The workflow in this case is simple, because service state ONLINE means that the service is available, which means the one or more commands, executed by the inspector 131 during the first phase of the exception handling at block 230 of FIG. 2 described above, have resolved the abnormal service behavior. In this case, an error diagnosis is performed at block 351 and an e-mail notification is sent to the administrator at block 352 to inform him about the successful service recovery.

Some example embodiments of the invention may include the above-illustrated modules and methods being written as one or more software components. These components, and the functionality associated with each, may be used by client, server, or peer computer systems. These components may be written in any computer programming language including object-oriented computer languages such as C++, and Java. The functionality described herein may be distributed among different components and may be linked to each other via application programming interfaces and compiled into one complete server and/or client application. Furthermore, these components may be linked together via distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or other configurations.

Software components described above are tangibly stored on a machine readable medium including a computer readable medium. The term "computer readable medium" should be taken to include a single medium or multiple media that stores one or more sets of instructions. The term "computer readable medium" should also be taken to include medium that is capable of tangibly storing or encoding instructions for execution by a computer system and that causes the computer system to perform any of the methods described herein.

Figure 4:
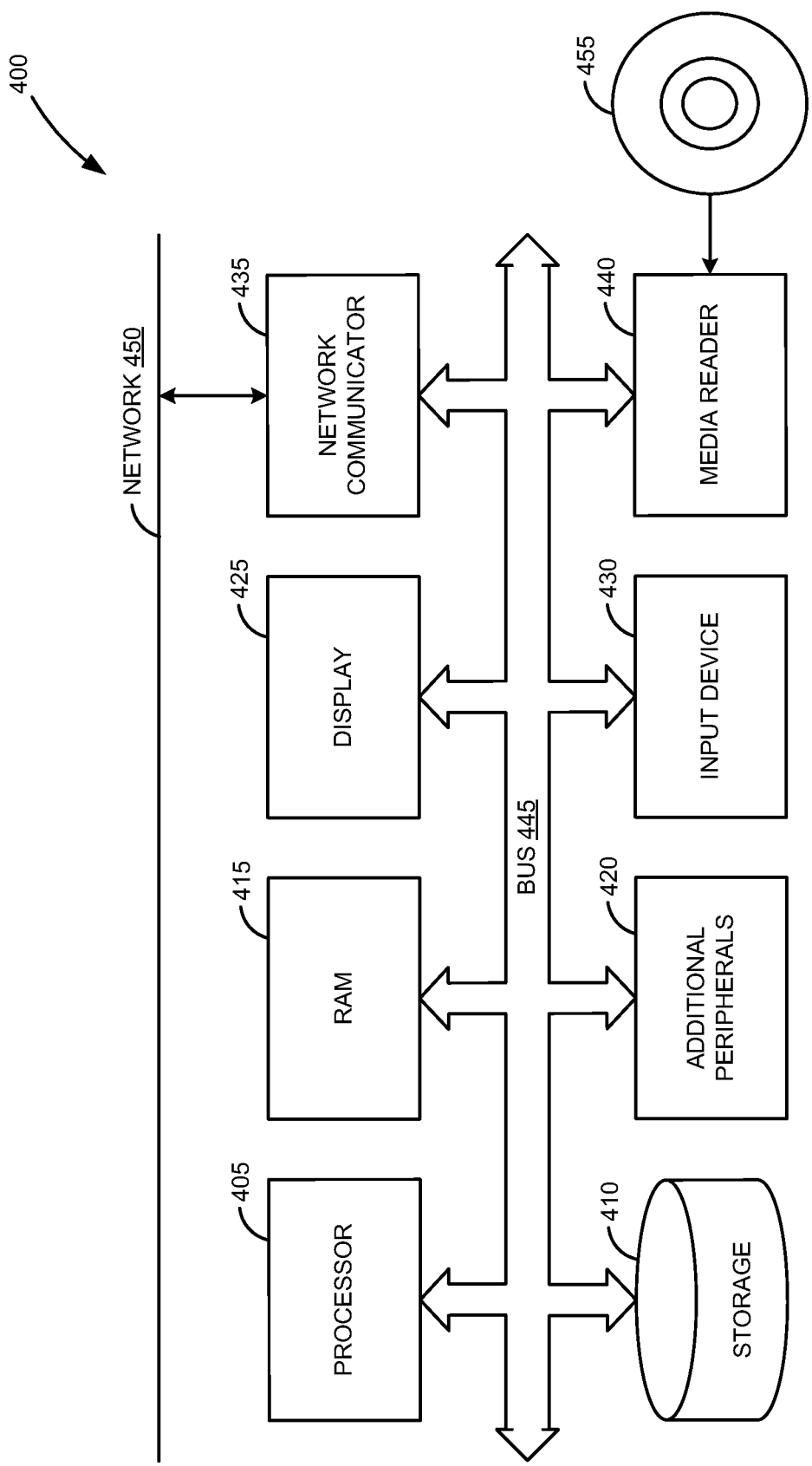
FIG. 4 is a block diagram of an exemplary computer system, in accordance with an embodiment of the present invention.

FIG. 4 is a block diagram of an exemplary computer system 400. The computer system 400 includes a processor 405 that executes programming code tangibly stored on a computer readable medium 455 to perform the methods of the invention described herein. The computer system 400 includes a media reader 440 to read the programming code from the computer readable medium 455 and store the code in storage 410 or in random access memory (RAM) 415. The storage 410 provides a large space for keeping static data where the programming code could be stored for later execution. From the programming code, a series of instructions are generated and dynamically stored in the RAM 415. The processor 405 reads instructions from the RAM 415 and performs actions as instructed. According to one embodiment of the invention, the computer system 400 further includes a display 425 to provide visual information to users, an input device 430 to provide a user with means for entering data and interfere with computer system 400, one or more additional peripherals 420 to further expand the capabilities of the computer system 400, and a network communicator 435 to connect the computer system 400 to a network 450. The components of the computer system 400 are interconnected via a bus 445.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A non-transitory computer readable storage medium having a set of instructions stored therein which when executed, cause a machine to perform a set of operations for three phase exception handling, comprising:
   upon determining an abnormal service behavior, execute one or more predefined commands stored in a corresponding inspector instance within a host to resolve the abnormal service behavior;
   upon determining that the abnormal service behavior persists after execution of the one or more predefined commands, execute one or more predefined rules stored in a centralized inspector engine to resolve the abnormal service behavior;
   receive notification about a current service state from the centralized inspector engine;
   display information in a user interface logged by the inspector instance and the centralized inspector engine; and
   upon determining that the abnormal service behavior persists after execution of the one or more predefined rules, execute one or more administrator defined commands to resolve the abnormal service behavior, wherein the one or more administrator defined commands are defined in the user interface based on the received notification and the displayed information.

2. The non-transitory computer readable storage medium of claim 1, wherein the instructions for executing the one or more predefined commands to resolve the abnormal service behavior further comprises instructions, which when executed by the computer, cause the machine to:
   restart the service a predefined number of times.

3. The non-transitory computer readable storage medium of claim 1, wherein the instructions for executing the one or more predefined rules to resolve the abnormal service behavior further comprises instructions, which when executed by the computer, cause the machine to:
   determine a predefined rule from one or more of the predefined rules to resolve the abnormal service behavior, wherein each predefined rule is a workflow comprising logical sequence of commands.

4. The non-transitory computer readable storage medium of claim 3, wherein the instructions for determining the predefined rule to resolve the abnormal service behavior further comprises instructions, which when executed by the computer, cause the machine to:
   receive a notification of a service state via an unified application programming interface (API) from the inspector instance, wherein the service state is selected from the group of ONLINE, OFFLINE and UNKNOWN; and
   based on the service state, determine the predefined rule to be executed to resolve the abnormal service behavior.

5. The non-transitory computer readable storage medium of claim 1, wherein the inspector instance monitors and communicates with a service via a unified application programming interface (API).

6. The non-transitory computer readable storage medium of claim 1, wherein the user interface provides an option to edit the one or more predefined rules to resolve the abnormal service behavior, and the user interface provides tips for resolving the abnormal service behavior.

7. The non-transitory computer readable storage medium of claim 1, wherein the received notification about the service state comprises one or more of an email, an instant mobile phone message.

8. A computer-implemented method for three phase exception handling, comprising:
   upon determining an abnormal service behavior, executing one or more predefined commands stored in a corresponding inspector instance within a host to resolve the abnormal service behavior;
   upon determining that the abnormal service behavior persists after execution of the one or more predefined commands, executing one or more predefined rules stored in a centralized inspector engine to resolve the abnormal service behavior;
   receive notification about a current service state from the centralized inspector engine;

display information in a user interface logged by the inspector instance and the centralized inspector engine; and upon determining that the abnormal service behavior persists after execution of the one or more predefined rules, executing one or more administrator defined commands to resolve the abnormal service behavior, wherein the one or more administrator defined commands are defined in the user interface based on the received notification and the displayed information.

9. The computer-implemented method of claim 8, wherein executing the one or more predefined commands to resolve the abnormal service behavior comprises restarting the service a predefined number of times.

10. The computer-implemented method of claim 8, wherein executing the one or more predefined rules to resolve the abnormal service behavior further comprises:
   determining a predefined rule from one or more of the predefined rules to resolve the abnormal service behavior, wherein each predefined rule is a workflow comprising logical sequence of commands.

11. The computer-implemented method of claim 10, wherein determining the predefined rule to resolve the abnormal service behavior further comprises:
   receiving a notification of a service state via an unified application programming interface (API), wherein the service state is selected from the group of ONLINE, OFFLINE and UNKNOWN; and
   based on the service state, determining the predefined rule to be executed to resolve the abnormal service behavior.

12. The computer-implemented method of claim 8, wherein the inspector instance monitors and communicates:
   with a service via a unified application programming interface (API).

13. The computer-implemented method of claim 8, wherein the user interface provides an option to edit the one or more predefined rules to resolve the abnormal service behavior, and the user interface provides tips for resolving the abnormal service behavior.

14. The computer-implemented method of claim 8, wherein the received notification about the service state comprises one or more of an email, an instant mobile phone message.

15. A computer system for three phase exception handling, comprising:
   a computer memory to store program code; and
   a processor to execute the program code to:
      upon determining an abnormal service behavior, execute one or more predefined commands stored in a corresponding inspector instance within a host to resolve the abnormal service behavior;
      upon determining that the abnormal service behavior persists after execution of the one or more predefined commands, execute one or more predefined rules stored in a centralized inspector engine to resolve the abnormal service behavior;
      receive notification about a current service state from the centralized inspector engine;
      display information in a user interface logged by the inspector instance and the centralized inspector engine; and
      upon determining that the abnormal service behavior persists after execution of the one or more predefined rules, execute one or more administrator defined commands to resolve the abnormal service behavior, wherein the one or more administrator defined commands are defined in the user interface based on the received notification and the displayed information.

16. The system of claim 15, wherein the program code to execute the one or more predefined commands to resolve the abnormal service behavior further comprises program code to:
   restart the service a predefined number of times.

17. The system of claim 15, wherein the program code to execute the one or more predefined rules to resolve the abnormal service behavior further comprises program code to:
   determine a predefined rule from one or more of the predefined rules to resolve the abnormal service behavior, wherein each predefined rule is a workflow comprising logical sequence of commands.

18. The system of claim 17, wherein the program code to determine the predefined rule to resolve the abnormal service behavior further comprises program code to:
   receive a notification of a service state via an unified application programming interface (API), wherein the service state is selected from the group of ONLINE, OFFLINE and UNKNOWN; and
   based on the service state, determining the predefined rule to be executed to resolve the abnormal service behavior.

19. The system of claim 15, wherein the inspector instance monitors and communicates with a service via a unified application programming interface (API).

20. The system of claim 15, wherein the user interface provides an option to edit the one or more predefined rules to resolve the abnormal service behavior, and the user interface provides tips for resolving the abnormal service behavior.

21. The system of claim 15, wherein the received notification about the service state comprises one or more of an email, an instant mobile phone message.

* * * * *